Patented Nov. 4, 1924.

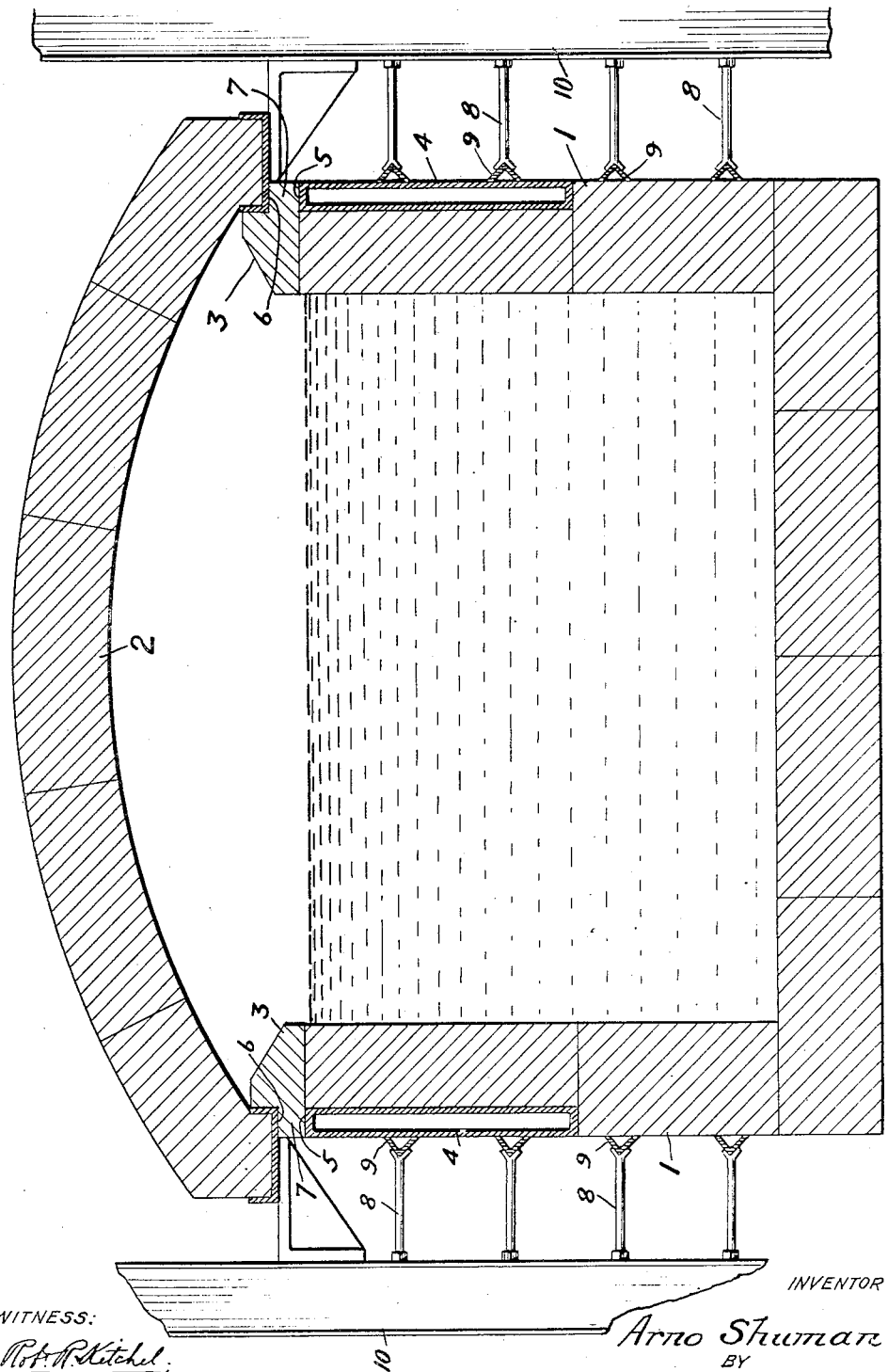

1,514,307

UNITED STATES PATENT OFFICE.

ARNO SHUMAN, OF PHILADELPHIA, PENNSYLVANIA, ASSIGNOR TO PENNSYLVANIA WIRE GLASS COMPANY, OF PHILADELPHIA, PENNSYLVANIA, A CORPORATION OF NEW JERSEY.

WATER-COOLED GLASS-TANK FURNACE.

Application filed January 28, 1920. Serial No. 354,554.

*To all whom it may concern:*

Be it known that I, ARNO SHUMAN, a citizen of the United States, residing at Philadelphia, in the county of Philadelphia and State of Pennsylvania, have invented certain new and useful Improvements in Water-Cooled Glass-Tank Furnaces, of which the following is a specification.

The principal object of the present invention is to prevent the tuck stones from falling into the tank even in the event of the occurence of such erosion or wear of the upper inner edges of the tank side walls as is possible notwithstanding the action of the water cooled boxes in opposing erosions or wear.

Other objects of the invention will appear from the following description which will be given in connection with the accompanying drawings forming part hereof and in which there is illustrated, in transverse section, portions of a water cooled glass tank furnace embodying features of the invention.

In the drawings 1, is the side wall and 2, is the arched roof of a glass tank furnace. The space between the roof and side wall is stopped by so-called tuck stones 3, in order to prevent the egress of flames and hot gases. These are usual provisions of a glass tank furnace, as are also the water cooled boxes 4.

The top surfaces 5, of the water boxes are arranged in position for supporting between them and the bottom surface 6, of the roof 2, the tuck stones 3, or more accurately, the projections 7, thereof, so that even if the inner edges of the top portions of the side walls are eroded or worn away the tuck stones may not fall into the tank, but on the contrary the water cooled boxes will resist erosion or wearing away and will remain in position and hold the tuck stones and so prevent the escape of flames and hot gases between the top of the side walls and the bottom of the roof. As shown the water cooled boxes 4, are arranged in cavities provided for their reception in the outer faces of the side walls and are held up to place by struts 8, and angle-irons 9, which also support the side walls from the buck-stays 10, but it will be obvious to those skilled in the art that the inner faces of the water boxes may be arranged flush with the outer faces of side walls which are not provided with cavities and still permit their top surfaces 5, to act in conjunction with the under faces 6, of the roof and support the tuck-stones in the manner described. The point is that neither the roof nor the water cooled boxes are eroded or worn away and that they are utilized to support the truck-stones, so that the latter may not fall into the tank even if the upper inner edges of its side walls disappear by erosion or otherwise.

I claim:

In a water cooled glass tank furnace the combination of a side wall provided at its top with an external cavity, a water cooled box arranged in the cavity and having its top flush with the top of the side wall, a roof spaced from the side wall, and a stone as 3 extending from the inner face of the tank between the top of the box and roof and stopping the space, substantially as described.

ARNO SHUMAN.